United States Patent [19]

Brown et al.

[11] Patent Number: 5,225,213
[45] Date of Patent: Jul. 6, 1993

[54] APPARATUS FOR DIFFERENTIAL PRESSURE FORMING AND TRIMMING

[75] Inventors: Gaylord W. Brown, Punta Gorda, Fla.; Albert W. Arends, Gladwin, Mich.

[73] Assignee: John Brown Inc., West Warwick, R.I.

[21] Appl. No.: 807,196

[22] Filed: Dec. 16, 1991

[51] Int. Cl.$^5$ .................. B29C 51/18; B29C 51/32; B29C 51/44

[52] U.S. Cl. .................. 425/292; 264/153; 264/163; 264/550; 264/553; 425/387.1; 425/388; 425/398; 425/416; 425/422; 425/451.7; 425/451.9

[58] Field of Search ............... 264/138, 153, 163, 550, 264/551, 553, 554; 425/292, 298, 387.1, 342.1, 388, 398, 346, 351, 422, 416, 443, 451.7, 451.9, 812

[56] References Cited

U.S. PATENT DOCUMENTS

| | | | |
|---|---|---|---|
| 3,267,521 | 8/1966 | Kostur | 425/292 |
| 3,346,923 | 10/1967 | Brown et al. | 425/162 |
| 3,376,607 | 4/1968 | Brown | 425/398 |
| 3,461,756 | 8/1969 | Mojonnier | 264/153 |
| 3,496,257 | 2/1970 | Brown et al. | 264/553 |
| 3,743,469 | 7/1973 | Gibbons | 425/451.7 |
| 4,105,736 | 8/1978 | Padovani | 264/551 |
| 4,273,738 | 6/1981 | Spengler | 264/163 |
| 4,313,358 | 2/1982 | Brown | 83/97 |
| 4,442,064 | 4/1984 | Myers et al. | 264/153 |
| 4,509,909 | 4/1985 | Arends | 425/388 |

FOREIGN PATENT DOCUMENTS 0171507 2/1986 European Pat. Off. ............ 425/292

Primary Examiner—Scott Bushey
Attorney, Agent, or Firm—Burnett W. Norton

[57] ABSTRACT

Apparatus for differential pressure forming an article in a sheet of thermoplastic material having a pair of opposed differential pressure molds at a forming and trimming station moveable between open positions and closed positions engaging opposite sides of the sheet of thermoplastic material for differentially pressure forming an article in the sheet. Mechanism is provided for severing the article from the sheet and includes a pair of opposed trim dies mounted on the molds for movement therewith between spaced apart positions and sheet engaging positions when the molds are moved between open and closed positions. After the part is formed, wedge mechanism is moved transversely of the relative path of travel of the dies for incrementally indexing one of the dies toward the other of the dies to sever the article at the forming and trimming stations.

36 Claims, 7 Drawing Sheets

APPARATUS FOR DIFFERENTIAL PRESSURE FORMING AND TRIMMING

BACKGROUND OF THE INVENTION

1. Field of the Invention

This invention relates to apparatus for differential pressure forming an article in a sheet of thermoplastic material at a forming and trimming station and then trimming the article integrally formed with the sheet at the forming and trimming station. More particularly, this invention relates to differential pressure forming method and apparatus including a pair of differential pressure molds at a forming and trimming station, wedge mechanism for incrementally indexing a trim die, mounted on one of the molds, towards an opposing trim die, mounted on the other of the molds, to trim the article from the sheet at the forming and trimming station.

2. Description of the Prior Art and Objects

Apparatus such as that disclosed in U.S. Pat. No. 3,664,791, granted to G.W. Brown, on May 23, 1972, which is incorporated herein by reference, has been provided heretofore for successively delivering a heated thermoplastic sheet to a heating station and then to a forming station at which molds engage the sheet to differentially pressure form an article in the sheet.

Apparatus such as that disclosed in U.S. Pat. No. 4,313,358, granted to Gaylord W. Brown on Feb. 2, 1982, which is incorporated herein by reference, has been provided heretofore for trimming articles integrally formed in a thermoplastic sheet at a trimming station which is downstream of the forming station.

Another differential pressure forming machine is illustrated in U.S. Pat. No. 3,346,923, issued to G.W. Brown, et al on Oct. 17, 1967, which is incorporated herein by reference, and includes a pair of opposed cooperating molds for engaging opposite sides of a heated thermoplastic sheet to differentially pressure form an article in the sheet. This prior art machine includes a female mold cavity on one side of the sheet and a male punch and pressurized air on the other side of the sheet for urging the sheet into the mold cavity.

It has been found that when pressurized air is introduced to the molds, the molds tend to separate and thus compressible o-rings have been mounted on the confronting portions of the molds for maintaining a seal between the molds and the thermoplastic sheet when the molds slightly separate under the force of the pressurized air.

Other differential pressure forming machines are disclosed in the U.S. Patent granted to G.W. Brown, et al on Oct. 17, 1967 and U.S. Pat. No. 3,496,257 issued to G.W. Brown on Feb. 17, 1970, which are incorporated herein by reference.

Differential pressure forming machines have included trim dies at the forming and trimming station for trimming the parts at the forming and trimming station, however, the prior machines included direct acting, hydraulically operated cylinders and/or cams for moving the trim mechanism to sever the article from the sheet.

Because of the rather substantial force required to move the molds between spaced apart, open positions and closed positions and to hold the molds closed when pressurized air is admitted to the molds, these prior art hydraulically operated cylinders are quite large and thus relatively expensive. Accordingly, it is an object of the present invention to provide differential pressure forming apparatus and method for forming and trimming articles in a sheet of thermoplastic material which is less expensive than the prior art machines.

Another object of the present invention to provide apparatus for differential pressure forming an article in a sheet of thermoplastic material at a forming and trimming station and severing the article from the sheet of material at the forming and trimming station and which eliminates the necessity of a hydraulically operated cylinder for moving one of the trim dies toward the other of the trim dies.

A further object of the present invention to provide apparatus for differential pressure forming an article in a sheet of thermoplastic material and severing the trimmed article from the sheet and which eliminates the necessity of o-rings for sealing the molds to the sheet.

It is a still further object of the present invention to provide apparatus for differential pressure forming an article in a sheet of thermoplastic material and severing the article from the sheet at a forming and trimming station and which positively clamps the molds to the sheet during the differential pressure forming operation and incrementally indexes opposing trim dies together after the forming operation to sever the sheet at the forming and trimming station.

Another object of the present invention is to provide apparatus for differential pressure forming the article in a sheet of thermoplastic material and severing the article from the sheet at a forming and trimming station including mechanism moveable in a path transverse to the path of travel of the molds for wedging trim dies together to sever the article at the forming and trimming station.

Yet another object of the present invention is to provide apparatus of the type described for forming an article in a sheet of thermoplastic material and severing the article from the sheet at a forming and trimming station and incorporates pneumatically operated cylinders for moving the trim actuator.

Still another object of the present invention is to provide apparatus for differential pressure forming an article in a sheet of thermoplastic material and severing a sheet at a forming trim station including a wedge which is moveable in a path transverse to the path of travel of the trim die and a roller engageable by the wedge for moving at least one of the trim dies to sever the article formed in the sheet.

Other objects and advantages of the present invention will become apparent to those of ordinary skill in the art as the description thereof proceeds.

SUMMARY OF THE INVENTION

Apparatus for differential pressure forming an article in a sheet of thermoplastic material and severing the formed article from the sheet comprising: a pair of opposed differential pressure molds relatively moveable toward and away from each other between spaced apart, open positions and closed positions sealed to opposite sides of the sheet for differentially pressure forming an article in a sheet at a forming and trimming station; a pair of opposed trim die mechanisms mounted on the mold for severing the articles formed in the sheet from the sheet at the forming and trimming station; and index means, moveable in a path of travel transverse to the path of travel of the molds for wedging at least one of the trim dies towards the other trim dies to sever the article from the sheet.

DESCRIPTION OF THE DRAWINGS

The invention may be more readily understood by referring to the accompanying drawings, in which.

DESCRIPTION OF PREFERRED EMBODIMENT

Figure 1:
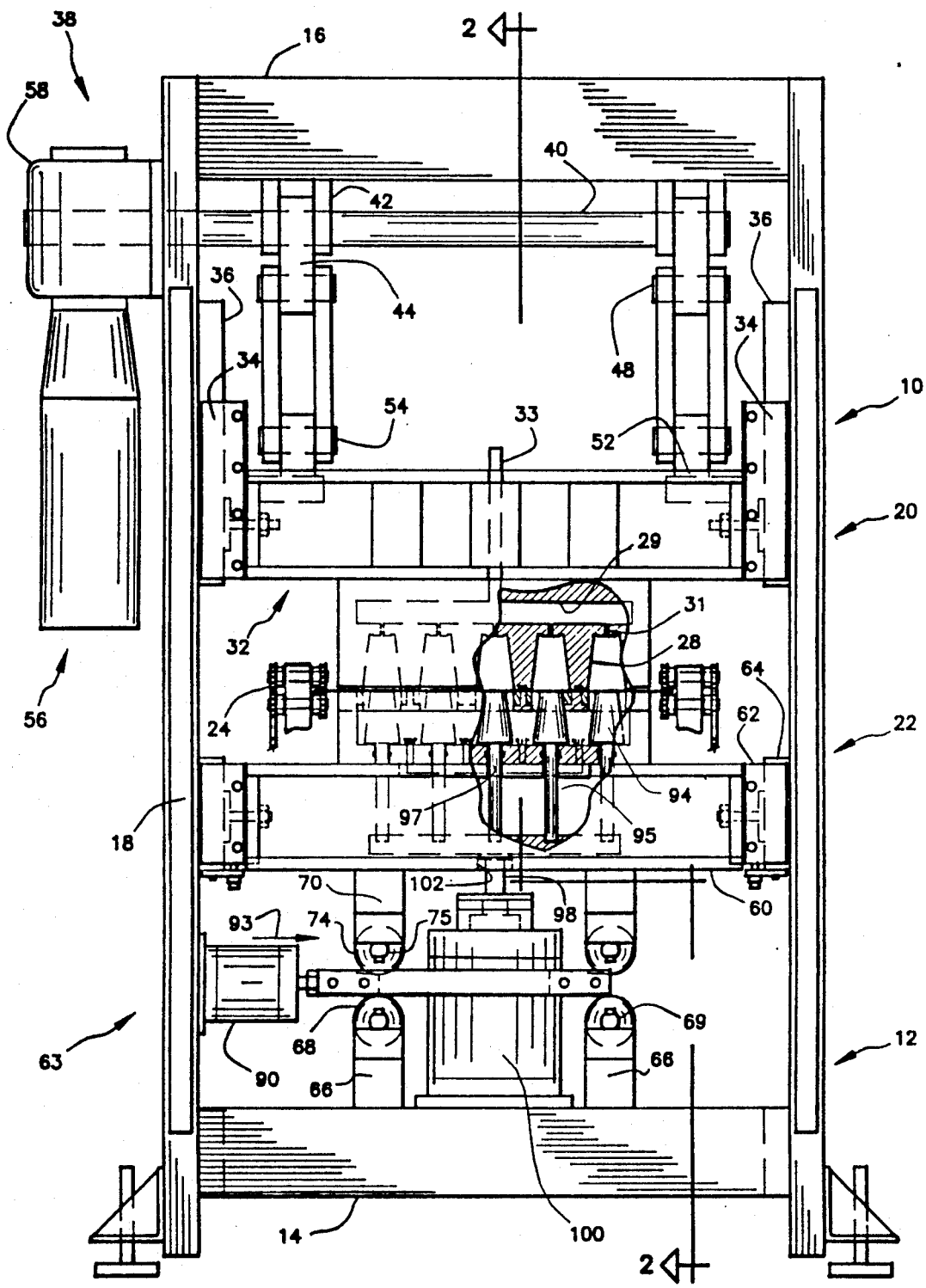
FIG. 1 is a front elevational view of a differential pressure forming machine constructed according to the present invention, parts of the frame being broken away to more clearly illustrate the mold construction, illustrating the molds in the closed molding position.

Apparatus constructed according to the present invention, generally designated 10, is provided for forming an article A (FIG. 9) in a sheet S of thermoplastic material, such as polystyrene, and severing the article A from the sheet. The apparatus 10 includes a frame, generally designated 12, including a lower base 14 and an upper frame header 16 spanned by spaced apart side rails 18. The articles A may suitably comprise three dimensional, truncated, cone-shaped thin walled parts, such as drinking cups.

The apparatus 10 includes an upper female die box assembly, generally designated 20, and a lower male die box assembly, generally designated 22. The thermoplastic sheet or web S is incrementally indexed between the upper and lower mold assemblies 20 and 22 in the usual manner by pairs of superimposed nesting, upper and lower endless chains 24 which are described more particularly in U.S. Pat. No. 3,217,852, incorporated herein by reference.

The female die box assembly includes a plurality of spaced apart mold cavities 28. The upper die box assembly 20 includes a vacuum manifold chamber 29 which connects to the cavities 28 by means of passages 31 and a line member 33 is employed to connect the vacuum manifold chamber 29 with a conventional rotary pump and surge tank. The general construction of the upper and lower die box assemblies 20 and 22 is more particularly illustrated in U.S. Pat. No. 3,346,923 which is incorporated herein by reference.

The upper female die box assembly 20 is mounted on an upper moveable platen, generally designated 32, having a pair of guides 34 which furnish guide surfaces for vertical travel of the upper platen 32 on vertical slides 36 fixed to the side rails 18.

Platen moving apparatus, generally designated 38, is provided for moving the upper platen 32 and includes a drive shaft, generally designated 40, journalled on a pair of spaced apart bearing blocks 42 depending from the frame header 16. A pair of relatively short toggle links 44 are fixed to the drive shaft 40 and is coupled to a pair of relatively long toggle links 46 via pivot pins 48. The lower ends 50 of the longer pair of toggle links are pivotally coupled to toggle blocks 52, which are fixed to the upper side of the moving platen 32, via pivot pins 54.

Figure 8:
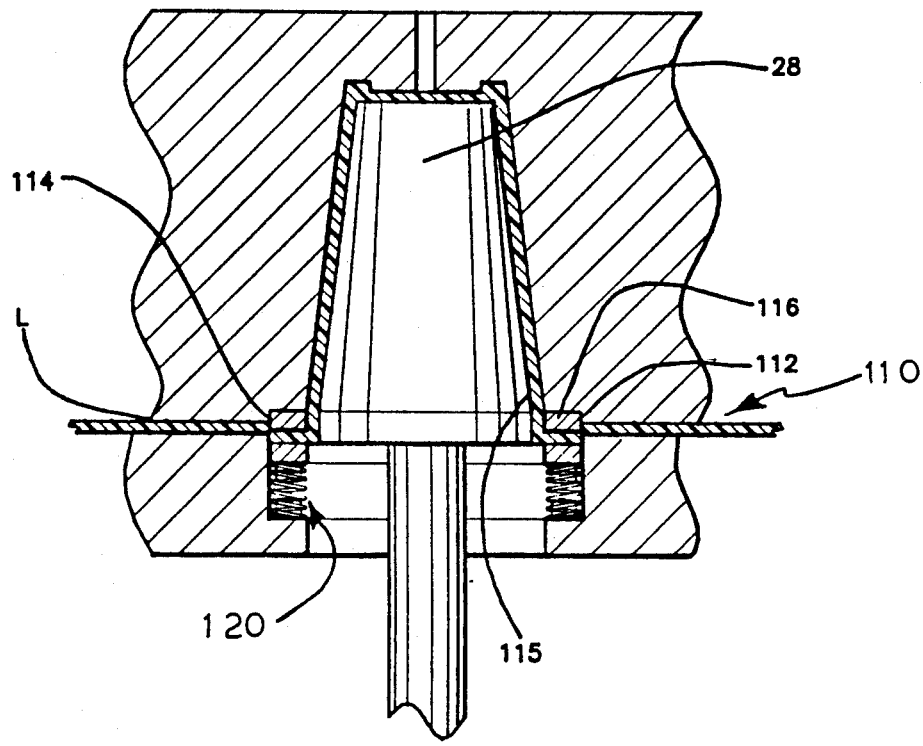
FIG. 8 is a view similar to FIG. 7 illustrating the parts in an adjusted position in which the article is formed in the sheet.

The drive shaft 40 is reciprocally rotated in a to-and-fro path about its axis 41 via a reversible drive motor, generally designated 56. The shaft 40 is coupled to the drive motor 56 via a gear box and screw, generally designated 58, for moving the upper platen 32 and upper die box assembly 20 between the open or raised position, illustrated in FIG. 2, and a lowered, closed, operative position engaging the sheet S as illustrated in FIG. 1 and 8 at a forming and trimming station.

The lower die box assembly 22 is mounted on a lower trim platen, generally designated 60, having end guides 62 guiding on vertical slides 64 fixed to the side rails 18.

The lower trim platen 60 is supported on the frame 12 by trim actuator indexing mechanism, generally designated 63, including longitudinally spaced pairs of roller mounting blocks 66 fixed to the base 14 and mounting a pair of longitudinally spaced apart lower rollers 68 via pins 69. The trim actuator indexing mechanism 63 includes another set of longitudinally spaced pairs of roller mounting blocks 70, depending from the underside 72 of the platen 66, journalling longitudinally spaced apart rollers 74 via pivot pins 75 in confronting relation with the underlying, frame mounted rollers 68.

Sandwiched between the upper and lower sets of trim actuator rollers 68 and 74 is trim actuator wedge mechanism, generally designated 76, including a pair of horizontally moveable, vertically inclined, longitudinally spaced apart wedge plates 78, having upper, vertically inclined wedging surfaces 80 for bearing against the undersides 82 of the upper rollers 74.

The cam or wedge plates 78 are mounted on a pair of side rails 84. One of the wedge plates 78 is coupled to a horizontally displaceable piston 88 of a horizontally disposed pneumatically operated cylinder 90 mounted on the side rail 18.

When the pneumatically operated trim actuator cylinder 90 is actuated to horizontally move the trim actuator cam plate 78, in the direction of the arrow 92, the wedge plates 78 will pass between the confronting rollers 68 and 74 to incrementally upwardly wedge the lower die box assembly 22 from the position illustrated in FIG. 8, to the sheet severing position illustrated in FIG. 9 to sever the sheet S in a manner to be described more particularly hereinafter.

A plurality of male plug assist members 94, which are in vertical axial alignment with the upper mold cavities 28, are mounted via upstanding bars 95 on a horizontal plug assist mounting plate 96 fixed to a piston 98 of a hydraulically operated, frame supported, hydraulically operated cylinder 100 which is mounted on the lower base frame 14. The piston 98 is freely received for vertical movement in a passage 102 provided in the lower platen 60. The plug assist mounting bars 95 are received in passages 97 provided in the lower platen 66 for free vertical movement relative thereto. When the sheet S is clamped between the upper and lower die box assemblies 20, 22 as illustrated in FIGS. 1 and 7, the hydraulic cylinder 100 is operated to vertically upwardly move the plug assist members 94 from the removed positions, illustrated in FIG. 7, to the plug assist positions inside the cavities 28, illustrated in FIG. 8, to assist movement of the portion of sheet S between the die box assemblies 20 and 22 into the mold cavities 28.

The male die box assembly 22 includes top and bottom walls 106 and 107, respectively, spanned by a perimetrically extending side wall 104. The top wall 106 includes a plurality of openings 108 aligned with the cavities 28 and the plug assist members 94. The diameter of the top wall openings 108 is larger than the diameter of the upper mold cavities 28 and also larger than the diameter of the plug assist members 94.

Figure 7:
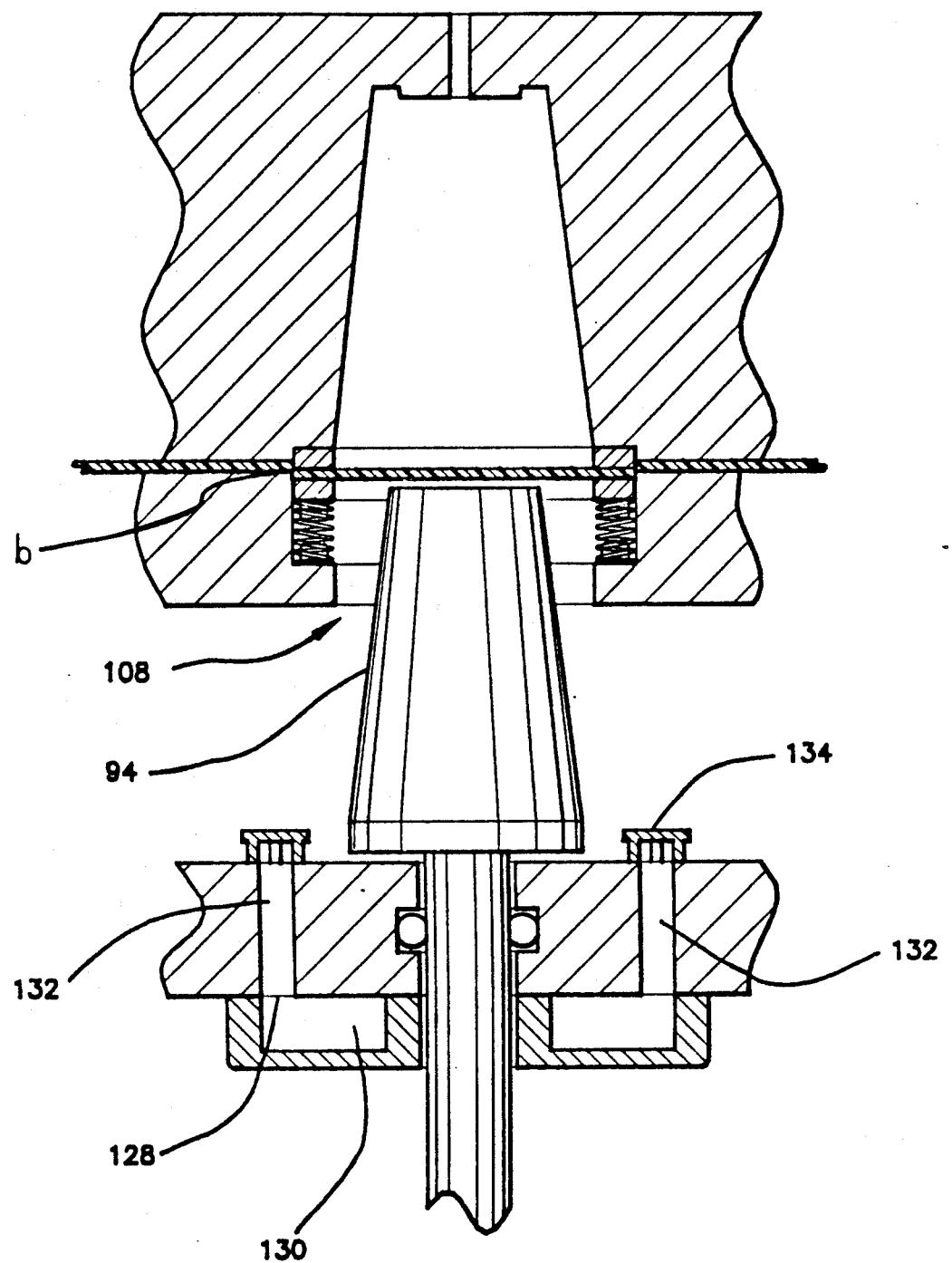
FIG. 7 is a further enlarged view illustrating the molds in the closed positions prior to forming but with the trim dies partially severing the sheet.

Air, under pressure of about 80 PSI and traveling at about 20 cubic feet per minute is supplied to the lower die box assembly 22 via a line 128 which connects with a manifold 130 leading from air supply hose to bored openings 134 in the lower mold wall, and, as shown in FIG. 7, baffle plates 136 are supported over each of the openings 132 so that the air stream passing through the openings 132 is deflected laterally and does not impinge directly on the plastic sheet S. This prevents cold spots from being formed on the plastic sheet which would interfere with the molding operation.

A trim die assembly, generally designated 110, is provided and includes an upper, annular trim die punch or trim knife, generally designated 112, having an annular knife edge 114, for engaging the upper side of the sheet S along the circumferential border b of an article A provided in the sheet S. The trim die knife 112 includes a cylindrical passage 116 surrounding the mouth 115 of the cavities 28 for receiving the plug assists 94.

The trim die assembly 110 includes a knife edge 118 provided on the upper annular edge of each passage 108 provided in the top wall 106 of the lower die box assembly 22. When the upper die box assembly 20 is moved downwardly to the closed position in which the sheet S is sealed to the upper and lower die box assemblies 20 and 22, the knife edges 114 and 118 will partially sever the border b as illustrated in FIG. 8. After the article A is formed, the lower die box assembly 22 is moved upwardly in the direction of the arrow M and the knife edges 114 and 118 are moved to the sheet severing positions illustrated in FIG. 9 to sever the article A from the sheet S.

An article stripper, generally designated 120, is provided for aiding the removal of the part A from the upper wall 106 of lower die box assembly 22 after the article A has been trimmed and includes an annular ring 122 mounted for vertical movement relative to the lower die box assembly 22 by springs 124 mounted at their lower ends on a stripper mounting plate 126 which is supported by side wall 104. The rings 122 are moveable between a rest position flush with the top wall 106 (FIG. 10) and successive lowered positions illustrated in FIGS. 8 and 9.

The annular trim die knife 112 will, as the die box assemblies 20 and 22 close, bear against the stripper ring 122 and move it downwardly from the fully extended position flush with the top wall 106 of lower die box 22 to the partially recessed position illustrated in FIG. 8.

Figure 9:
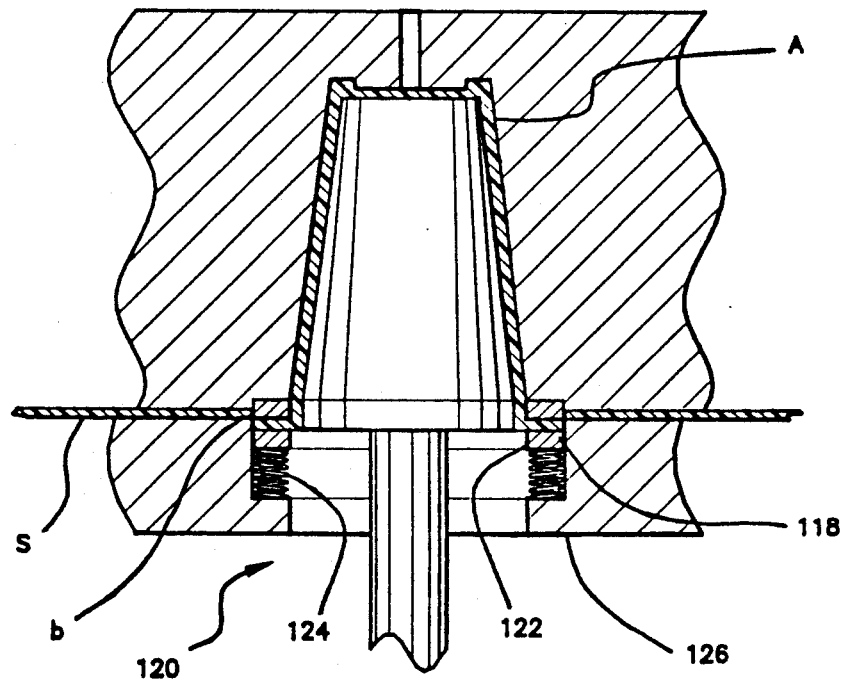
FIG. 9 is a view similar to FIGS. 6 and 7 illustrating the parts when the article is trimmed from the sheet.

When the lower mold assembly 22 is indexed upwardly to sever the article A, the stripper ring 122 will be moved further downwardly to the fully recessed positions illustrated in FIG. 9 to further compress the springs 124.

Figure 10:
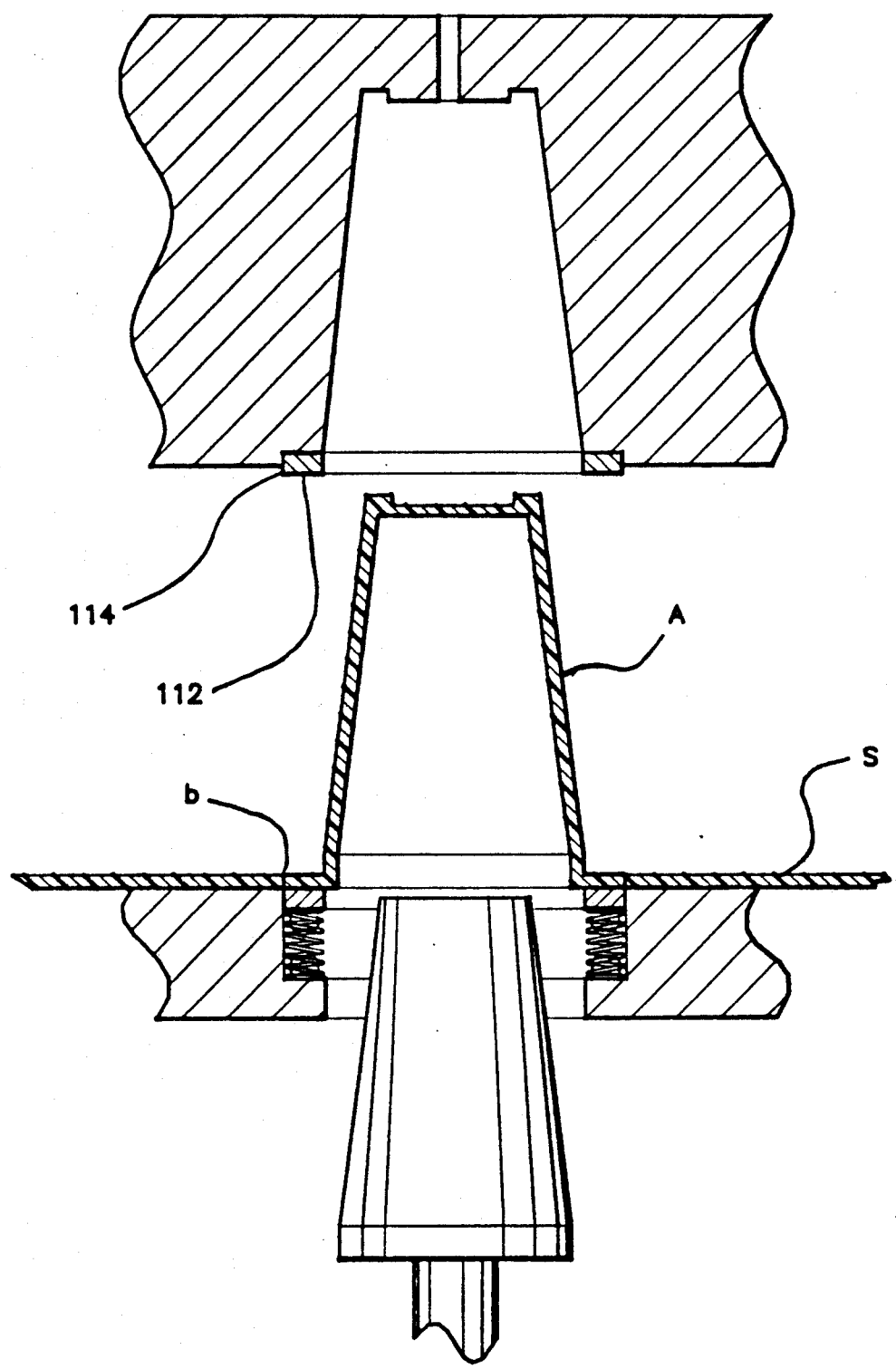
FIG. 10 is a view similar to FIGS. 7-9 illustrating the molds separated after the article is formed and severed.

When the upper and lower die box assemblies 20 and 22 are retracted to their spaced, open positions, the stripper rings 124 will be returned to the rest position, illustated in FIG. 10, flush with the top wall 106 by the springs 124 to aid the removal of the article A from the top wall 106.

OPERATION

Figure 2:
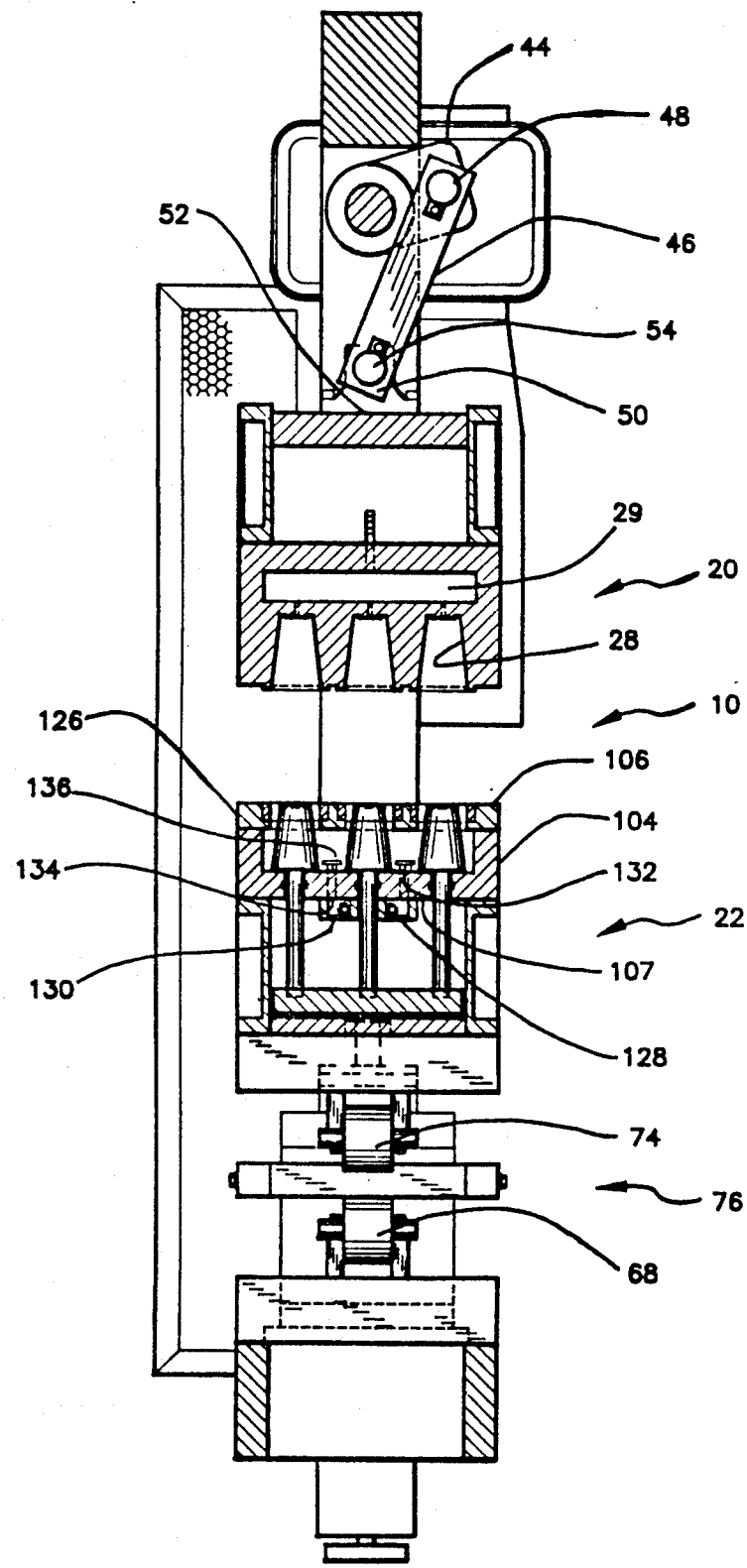
FIG. 2 is a sectional end view, taken along the line 2—2 of FIG. 1, but illustrating the molds in the spaced apart positions.
Figure 3:
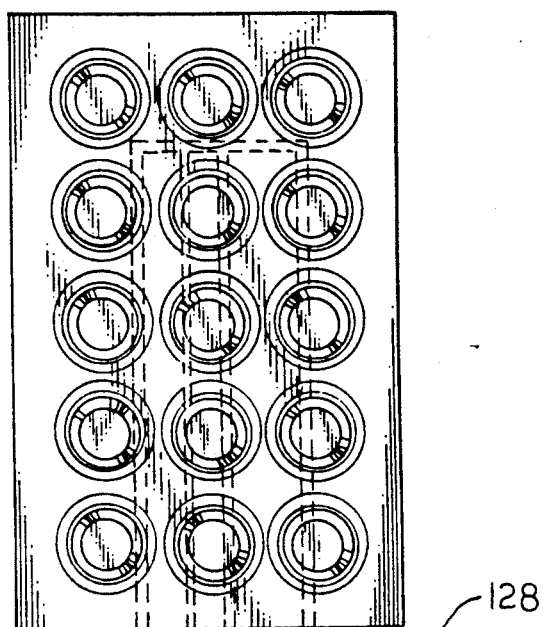
FIG. 3 is an enlarged top plan view of the lower die box assembly taken along the line 3—3 of FIG. 4.
Figure 4:
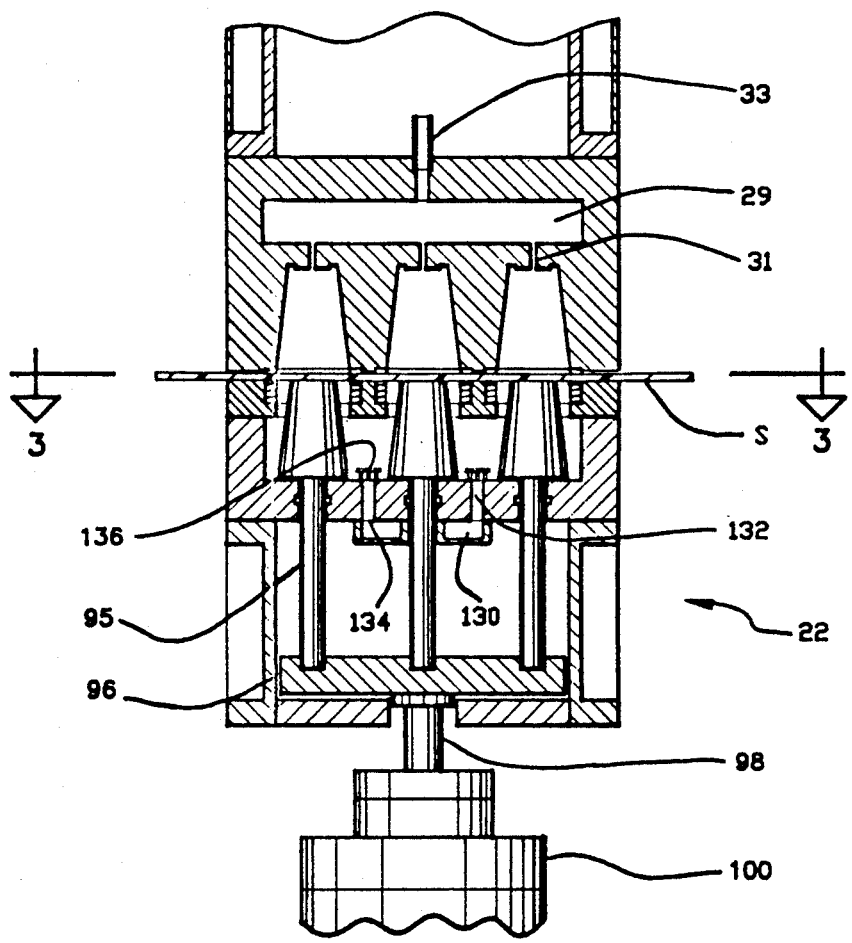
FIG. 4 is an enlarged sectional front view of the die box assemblies only.
Figure 5:
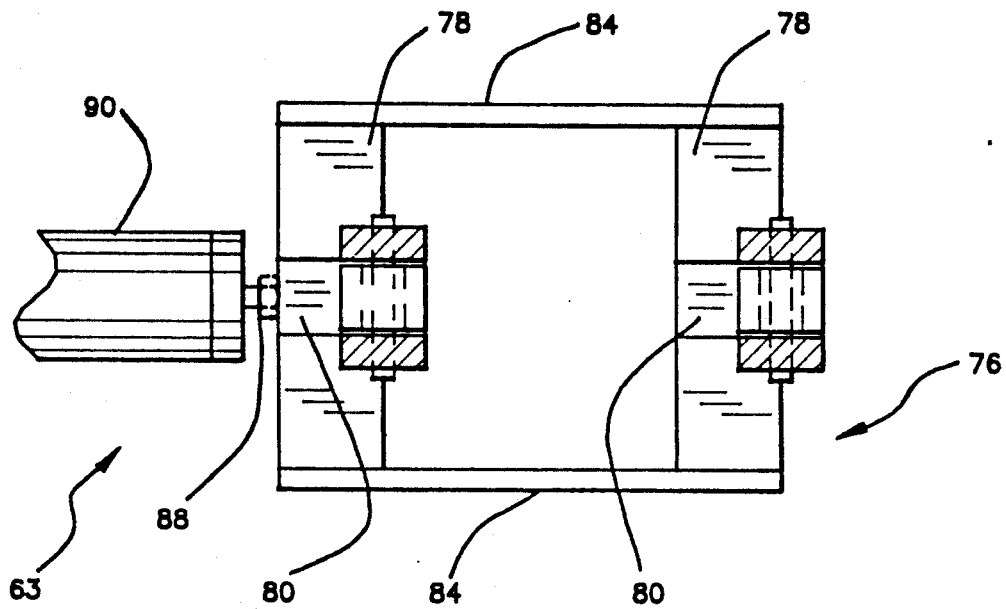
FIG. 5 is a top plan sectional view, taken along the line 5—5 of FIG. 6.
Figure 6:
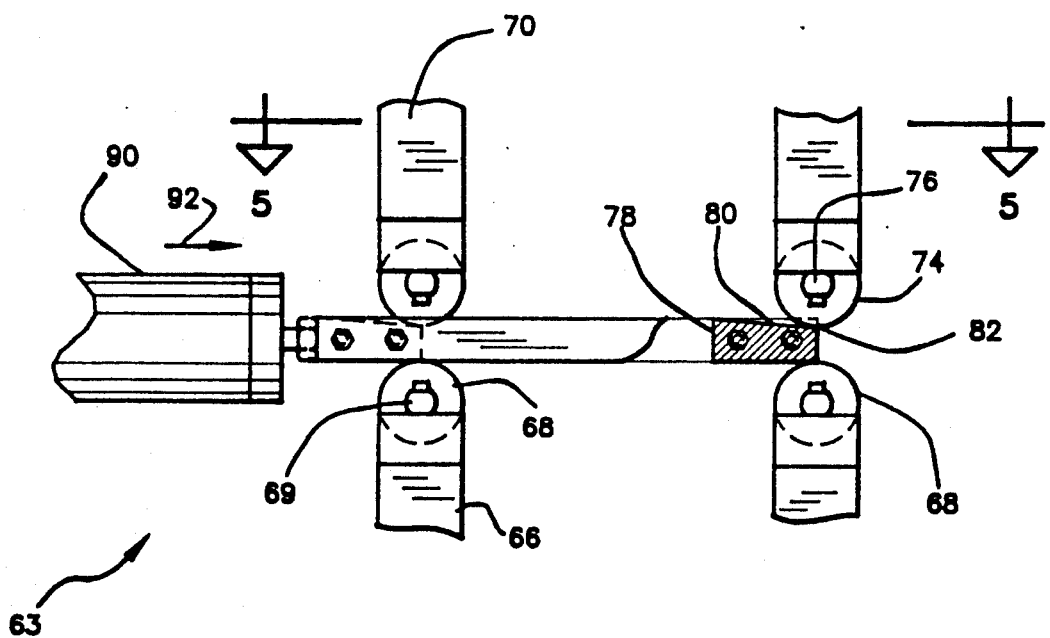
FIG. 6 is a greatly enlarged front elevational view of the trim actuator assembly for upwardly indexing the lower trim die, part of the side rail being broken away to more clearly illustrate one of the cam plates.

With the upper and lower die box assemblies 20, 22 in the open positions illustrated in chain lines FIG. 2, the thermoplastic sheet S is fed into the machine to a position resting on the upper wall 106 of lower die box assembly 22.

The drive motor 56 is operated to lower the upper platen 32 and upper die box assembly 20 to the closed position illustrated in FIGS. 1 and 7 wherein the lower surface L of the upper mold assembly 20 engages and seals to the upper surface of the sheet S and clamps the sheet S between the die box assemblies 20, 22 as illustrated in FIGS. 1 and 7.

The plug assist operating cylinder 100 is then actuated to upwardly move the plug assists 94 to the positions illustrated in FIG. 8 to stretch portions of the sheet S into the cavities 28. Pressurized air is provided through ports 130 and opening ports 132 and 134 to finish stretching and cool the sheet S. When the upper and lower die box assemblies 20 and 22 move to the closed positions illustrated in FIG. 7, the trim knife 112 partially severs the border b of the article A, as illustrated in FIG. 7.

The wedge assembly 76 has no cushion as does the prior art hydraulically operated cylinders and thus provides positive support for the lower die assembly 22 and does not downwardly "give" or yield when air pressure is supplied to the die box assemblies 20 and 22.

After the article A is formed at the forming and trimming station (FIG. 8), the trim actuator cylinder 90 is then pneumatically operated to horizontally move the wedge plates 78, in the direction of the arrow 92, to upwardly force the wedging rollers 74 and the lower platen and die box assembly 22 to the positions illustrated in FIG. 9. This will force the outer trim die knife edge 118 past the upper annular knife edge 114 to sever the article A from the sheet S. Because of the mechanical advantage obtained by the wedging mechanism, the force required to operate the pneumatic cylinder 90 is relatively low air blowing operation.

The drive motor 56 and the cylinders 100 and 90 are then reversely operated to raise the upper die box assembly 20 and concurrently lower the plug assists 94 and the lower die box assembly 22 to the open positions illustrated in FIG. 10. The sheet S, with the severed articles A loosely coralled therein, is then indexed downstream. The severed articles A are moved by the sheet S to a remote position. If desired, the severed articles A can be dislodged from the sheet S and the mold and trim station via an air gun (not shown).

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What is claimed is:

1. In combination:

a differential pressure forming machine including
  a frame;
  means for supporting a thermoplastic sheet on said frame at a forming and trimming station;
  a pair of opposed cooperating mold means, including means for applying differential pressure to said sheet, mounted on said frame for movement between spaced apart, open positions and closed positions engaging opposite sides of said sheet for differential pressure forming an article in said sheet at said forming and trimming station; and
  means for relatively moving said pair of opposed mold means between said spaced apart, open positions and said closed positions engaging opposite sides of said sheet;
    apparatus for trimming a formed article from said sheet at said forming and trimming station including
      a pair of opposed trim dies mounted on said pair of opposed mod means for movement therewith between removed positions and less spaced positions engaging opposite sides of said sheet when said mold means are moved from said open positions to said closed positions, at least one of said trim dies being relatively moveable toward the other of said trim dies between said less spaced position and a sheet severing position; and
      wedge means for incrementally indexing said one of said trim dies in a path of travel toward the other of said trim dies from said less spaced position to said sheet severing position to sever a formed article from said sheet at said forming and trimming station.

2. The combination set in claim 1 wherein said wedge means is moveable in a to-and-fro path of travel transverse to said path of travel of said one trim die.

3. The combination set forth in claim 1 wherein said wedge means includes roller means coupled to one of said mold means and a cooperating wedge member moveable in a path of travel transverse to said path of travel of said one trim die between an inoperative position and a wedging position to displace said roller means and said one mold means toward the other of said mold means.

4. The combination set forth in claim 3 including pneumatically operated drive means for moving said wedge member in said transverse of travel.

5. The combination set forth in claim 3 wherein said wedge member includes a pair of laterally spaced apart mount bars mounting a pair of longitudinally spaced cam plates; said roller means including a pair of longitudinally spaced rollers rotatably supported by said cam plates.

6. The combination set forth in claim 5 wherein said wedge member is mounted on said frame.

7. The combination set forth in claim 5 including an additional pair of rollers mounted on said frame for supporting said longitudinally spaced cam plates.

8. The combination set forth in claim 1 where said one trim die is vertically moveable and said wedge means is horizontally moveable to incrementally vertically index said one trim die.

9. The combination set forth in claim 8 wherein said pair of mold means includes lower mold means and vertically moveable upper mold means; said means for relatively moving said mold means includes means for vertically downwardly moving said upper mold means toward said lower mold means to sealingly clamp said sheet between said upper and lower mold means.

10. The combination set forth in claim 8 wherein said trim dies include upper and lower vertically moveable trim dies; said lower trim die being mounted on said lower mold means for movement therewith.

11. The combination set forth in claim 1 wherein one of said mold means includes a female mold cavity and the other of said mold means includes a male plug assist for moving a portion of said sheet into said cavity as said mold means are relatively moved from said open positions to said closed positions, said one trim die comprising an annular trim ring for receiving and passing said male plug assist as said male plug assist moves toward said mold cavity.

12. The combination set forth in claim 1 wherein said means for applying differential pressure includes means for admitting air under pressure to said mold means to urge a portion of said sheet into one of said mold means which defines a female mold cavity; said wedge means includes means for clamping said mold means together in said closed positions when said air is admitted to said mold means.

13. The combination set forth in claim 1 wherein article stripper means is mounted on one of said mold means for movement relative thereto between an article stripping position, substantially flush with said one of said mold means, and a recessed position; said stripper means being positioned in alignment with said trim die means on the other of said mold means to be moved thereby to said recessed position when said mold means move from said open positions to said closed positions; and yieldable means allowing movement of said stripper means to said recessed position but urging said stripper means to said article stripping position to strip the formed and severed article from said mold means when said mold means are returned to said open position.

14. The combination set forth in claim 13 wherein said stripper means is further moveable from said recessed position to a further recessed position when said wedge means incrementally indexes said one trim die.

15. Apparatus for differentially pressure forming an article in a sheet of thermoplastic material at a forming and trimming station and for severing the article from said sheet at said forming and trimming station comprising:
  a frame;
  means for supporting a thermoplastic sheet of material on said frame at said forming and trimming station;
  a pair of opposed cooperating mold means, including means for applying differential pressure to opposite sides of said sheet, mounted on said frame at said forming and trimming station for movement between spaced apart positions and closed positions engaging opposite sides of said sheet for differential pressure forming an article in said sheet;
  means at said forming and trimming station for severing an article formed in said sheet including:
    first and second opposed trim dies relatively moveable in a first to-and-fro path of travel between removed positions and sheet engaging positions when said mold means move between said spaced apart positions and said closed positions engaging opposite sides of said sheet; said opposed trim dies being relatively moveable in said first to-and-fro path of travel between said sheet engaging positions and sheet severing positions; and wedge means, moveable in a direction transverse to said first to-and-fro path of travel, for incrementally indexing one of said trim dies toward the other of said trim dies from said sheet engaging position to said sheet severing position to sever a formed article from said sheet at said forming and trimming station.

16. The apparatus set forth in claim 15 wherein said wedge means includes cooperating roller means coupled to said one trim die and a transversely moveable wedge member for moving said roller means.

17. The apparatus set forth in claim 16 wherein one of said mold means includes a female mold cavity and means for admitting pressurized air to said one mold means to urge said sheet into said cavity, said wedge means including means for clamping said mold means together when said air is admitted to said one mold means.

18. The apparatus set forth in claim 17 wherein article stripper means is mounted on one of said mold means for movement relative thereto between an article stripping position and a recessed position; said stripper means being aligned with said trim die means on the other of said mold means to be moved thereby to said recessed position when said mold means move from said open positions to said closed positions; and yieldable means yieldably allowing movement of said stripper means to said recessed position but yieldably urging said stripper means to said article stripping position.

19. The apparatus set forth in claim 18 wherein said stripper means is further moveable from said recessed position to a further recessed position when said wedge means incrementally indexes said one trim die.

20. Differential pressure forming apparatus including:

a frame;

means for supporting a thermoplastic sheet on said frame at a forming and trimming station;

a pair of opposed cooperating mold means at said forming and trimming station, including means for applying differential pressure to opposite sides of said sheet, for engaging opposite sides of said sheet and differential pressure forming an article in said sheet;

means for relatively moving said pair of opposed mold means between spaced apart, open positions and first closed positions engaging opposite sides of said sheet; and apparatus for trimming a formed article in said sheet from said sheet at said forming and trimming station including a pair of opposed cooperating trim dies mounted on said pair of opposed mold means for movement therewith between spread positions and less spread positions engaging opposite sides of said sheet adjacent the formed article when said mold means relatively move from said open positions to said first closed positions; and means for incrementally moving one of said mold means toward said other of said mold means from said first closed position engaging opposite sides of said sheet to further closed position to incrementally move one of said trim dies toward the other of said trim dies from said less spread position to a sheet severing position;

said means for incrementally moving said one mold means including wedge means reacting between said frame and said one mold means.

21. In combination with a differential pressure forming machine including a frame;

means for supporting a thermoplastic sheet on said frame at a forming and trimming station;

a pair of opposed cooperating mold means at said forming and trimming station, including means for applying differential pressure to opposite sides of said sheet, for engaging opposite sides of said sheet and differential pressure forming an article in said sheet; and means for relatively moving said pair of opposed mold means between spaced apart, open positions and closed positions engaging opposite sides of said sheet; and apparatus for trimming a formed article from said sheet at said forming and trimming station including a pair of opposed trim dies on opposite sides of said sheet at said forming and trimming station, relatively moveable in a first to-and-fro path of travel between removed positions, less spaced positions engaging opposite sides of said sheet and, sheet severing positions; and wedge means, moveable in a direction transverse to said first to-and-fro path of travel, for incrementally indexing one of said trim dies toward the other of said trim dies from said less spread position to said sheet severing position to sever a formed article from said sheet at said forming and trimming station.

22. Apparatus for differential pressure forming an article in a sheet of thermoplastic material and severing the article from the sheet comprising:

upper and lower, opposed differential pressure molds at a forming and trimming station;

means for moving a sheet of thermoplastic material to a position between said molds;

means for moving at least said upper mold toward said lower mold to sandwich said sheet between and in sealing engagement with, said upper and lower molds;

means for applying differential pressure to opposite sides of a portion of said sheet between said molds to integrally form an article in said sheet;

means for severing said article from said sheet at said forming and trimming station including a pair of opposed, upper and lower cooperating trim dies, mounted on said upper and lower molds respectively; and means for upwardly indexing said lower mold to move said lower trim die toward said upper trim die and sever the formed article from the sheet including horizontally moveable wedge means for upwardly wedging said lower mold.

23. The apparatus set forth in claim 22 wherein said horizontally moveable means includes pneumatically operated drive means.

24. The apparatus set forth in claim 22 wherein said horizontally moveable means includes a vertically inclined cam plate horizontally moveable between a rest position and a camming position and roller means mounted on said lower mold and engageable by said plate to be forced vertically upwardly as said roller means moves to said camming position to vertically upwardly move said lower mold.

25. The apparatus set forth in claim 22 wherein said upper mold includes a female mold cavity for receiving a portion of said sheet;
   said severing means including an annular trim die encircling said cavity;
   means for mounting said trim die in such position as to partially sever an encircling portion of said sheet encircling the article formed when said molds move into sealing engagement with said sheet.

26. The apparatus set forth in claim 25 wherein said severing means includes means for upwardly moving said lower trim die to upwardly force said encircling portion of said sheet and cause said upper trim die to completely sever said encircling portion of said sheet.

27. Differential pressure forming and trimming apparatus comprising:
   a frame;
   upper and lower opposed, differential pressure molds relatively vertically moveable between spaced apart, open positions, less spaced apart closed molding positions, and sheet severing positions;
   means for moving a sheet of thermoplastic material between said molds;
   means for relatively moving said molds from said open positions to said closed molding positions to sealingly engage opposite sides of said sheet at a forming and trimming station;
   means for applying differential pressure to said molds to form an article in said sheet;
   upper and lower opposed trim die means mounted on said upper and lower molds for movement therewith for severing said formed article from said sheet; and
   indexing means for relatively moving said molds from said closed molding positions to said sheet severing positions to force said trim dies toward each other to sever the formed article from said sheet at said forming and trimming station;
   the improvement wherein said indexing means comprises horizontally moveable trim actuator wedge means for vertically wedging at least one of said molds toward the other of said molds between said closed molding position and said sheet severing positions.

28. The apparatus set forth in claim 27 wherein said horizontally moveable trim actuator wedge means includes a vertically inclined cam plate; means on said frame for horizontally moving said cam plate in a to-and-fro path of travel; and roller means mounted on said lower mold for bearing against said cam plate to be upwardly moved thereby.

29. The apparatus set forth in claim 28 wherein said means for horizontally moving said cam plate comprises pneumatically operated drive means.

30. The apparatus set forth in claim 28 wherein said horizontally moveable trim actuator wedge means comprise a pair of horizontally spaced apart cam plates, a pair of spaced apart bars coupling said cam plates together; means on said frame, coupled to said cam plates, for horizontally moving said cam plates in a to-and-fro reciprocal path of travel; and a pair of rollers mounted on said lower mold and engageable by said cam plates.

31. Apparatus for differential pressure forming an article in a sheet of thermoplastic material and severing the formed article from the sheet comprising:
   a frame;
   a pair of opposed differential pressure mold means, including means for applying differential pressure to opposite sides of said sheet, relatively moveable in a first path of travel toward and away from each other between spaced apart, open positions and closed positions wherein said mold means are sealed to opposite sides of said sheet for differential pressure forming an article in said sheet at a forming and trimming station;
   a pair of opposed trim die means mounted on said mold means for severing articles formed in said sheet from said sheet at said forming and trimming station; and
   index wedge means, moveable in a path of travel transverse to said first path of travel, for wedging at east one of said trim die means toward the other of said trim die means to sever said articles from said sheet at said forming and trimming station.

32. The apparatus set forth in claim 31 wherein said index means for indexing at least one of said trim die means includes means for incrementally indexing one of said molds means toward the other of said mold means.

33. The apparatus set forth in claim 32 wherein said means for incrementally indexing one of said means includes means operative after an article is formed in said sheet.

34. The apparatus set forth in claim 32 including means mounting said trim die means on said mold means in such positions as to partially sever said sheet at said trimming and forming station when said mold means are moved to said closed positions.

35. The apparatus set forth in claim 31 wherein said index means includes a wedge member mounted on said frame and a roller means mounted on one of said mold means for movement by said wedge member.

36. The apparatus set forth in claim 35 including pneumatically operated drive means for moving said wedge member in a to-and-fro, reciprocal path of travel.

* * * * *